United States Patent [19]

Noro et al.

[11] Patent Number: 4,661,325
[45] Date of Patent: Apr. 28, 1987

[54] STERILIZATION PROCESSING SYSTEM FOR CAN-SEALED PRODUCTS

[75] Inventors: Shingo Noro; Kunio Saitou, both of Nagoya; Hideki Izumimoto, Takatsuki, all of Japan

[73] Assignees: Mitsubishi Jukogyo Kabushiki Kaisha; Yamashita Iron Works, Ltd., both of Japan

[21] Appl. No.: 699,863

[22] Filed: Feb. 8, 1985

[51] Int. Cl.⁴ .......................... A61L 2/06; A23L 3/04
[52] U.S. Cl. .................................. 422/304; 422/302; 414/157; 414/211; 426/521
[58] Field of Search ...................... 422/26, 33, 38, 292, 422/299, 302–304; 426/483, 484, 487, 521; 414/152, 153, 157, 211; 99/468, 470, 474, 483, 484, 487

[56] References Cited

U.S. PATENT DOCUMENTS 3,682,290  8/1972  Van Gal et al. ................. 414/71 X
3,869,049  3/1975  Selusnik et al. ................. 414/42 X
3,927,976  12/1975  Reimers et al. ................. 426/407 X Primary Examiner—Barry S. Richman
Assistant Examiner—Jill Johnston
Attorney, Agent, or Firm—McGlew and Tuttle

[57] ABSTRACT

A system for sterilizing can-sealed products, stored in aligned groups in a carrying basket for sterilization, uses loading and unloading conveyors for the systematic loading and unloading of alternating groups of canned products and partition panels, into and out of the basket. Pool conveyors on the entrance and exit sides of a sterilization unit for sterilizing the products, conveys and temporarily stop the basket prior to and after sterilization.

6 Claims, 15 Drawing Figures

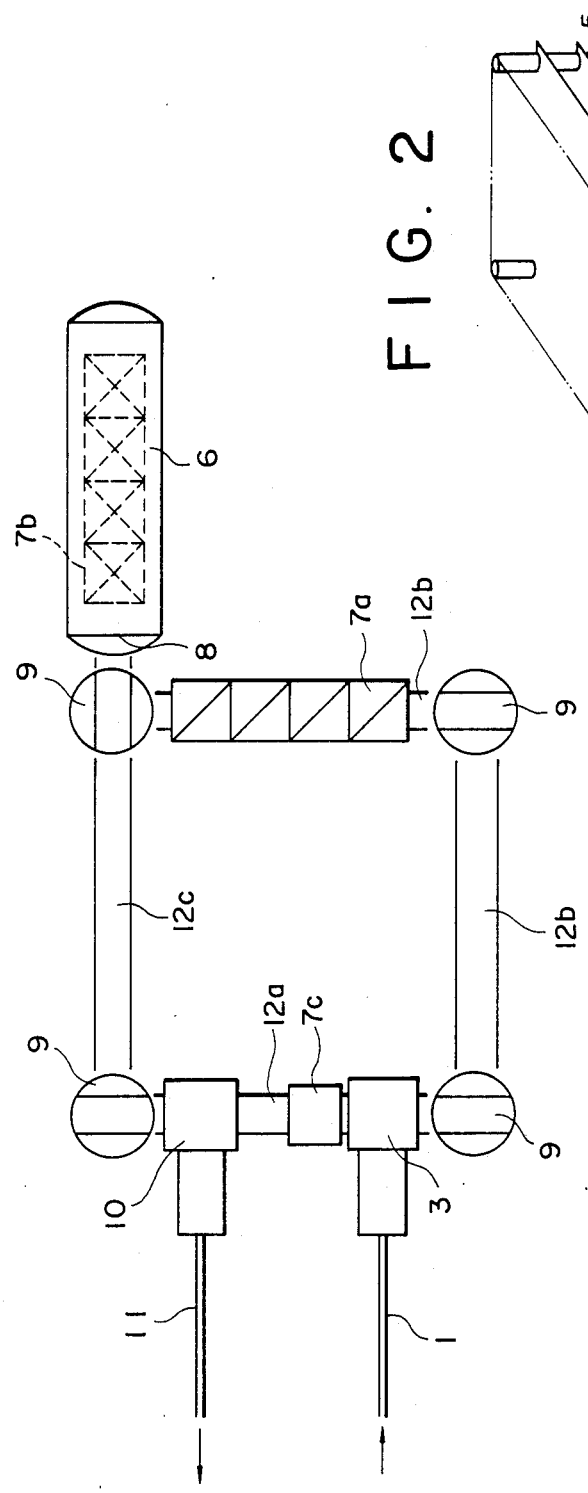
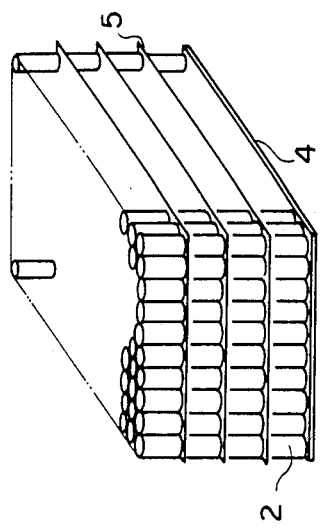
FIG. 1 PRIOR ART
FIG. 2

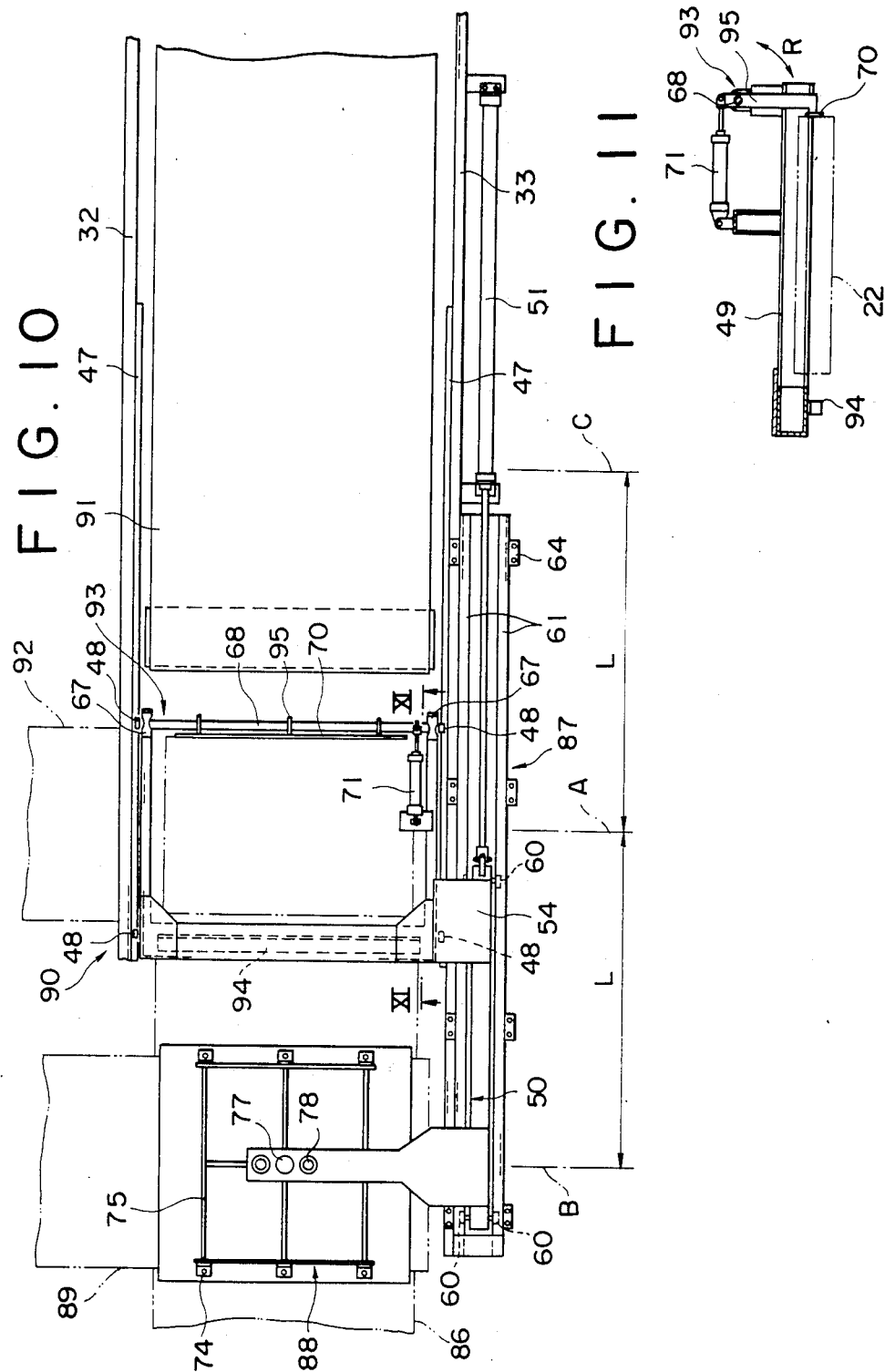

STERILIZATION PROCESSING SYSTEM FOR CAN-SEALED PRODUCTS

BACKGROUND OF THE INVENTION

The present invention relates, generally, to an improvement in the sterilization processing system for can-sealed products.

It is generally the practice in a so-called batch type sterilization process, to arrange sealed products to be sterilized in a stacked relationship for a collective processing to be conducted on a lot by lot basis. This avoids limitations on the throughput of such a process. Typical prior art approaches to such a processing system are disclosed, for instance, in Canadian Patent Application No. 411,616 and U.S. patent application Ser. No. 413,254. These systems are directed in common to the provision of a sterilization process system for retort pouches, in which a series of pouches are arranged in an aligned relationship on a tray, which is stacked on other such trays on a pallet for the purpose of transportation and sterilization. It is to be noted that since it is generally difficult, in practice, to make such pouches self-supported, unlike canned products, and since they are susceptible to damage during handling, it is essential to handle these pouches using trays. Also, since these pouches are generally conveyed with space between the pouches, it is relatively easy to align the pouches on a tray. This is contrasted to the case of canned products that can usually be conveyed with the conveyor or "crammed" full of canned products.

FIGS. 1 and 2 show a typical arrangement for sterilizing canned products which will be helpful to better understand the present invention.

Referring to FIGS. 1 and 2, a supply conveyor 1 supplies a series of can-sealed products, shown at 2 in FIG. 2, to a stacking machine at 3, this stacking machine being adapted to stack a required number of can-sealed products 2 in a specified number of stages or layers. These layers are also shown in FIG. 2 which illustrates the general appearance of a stack of canned products, stacked in aligned positions by stacking machine 3. FIG. 2 shows a typical example of the plurality of canned products or cans 2 stacked one upon another on a ground platform 4, equipped with carrying wheels (not shown) for running in engagement along tracking rails. The layers of cans are separated by partition panels 5.

FIG. 1 also shows a sterilizer unit 6 which is of the batch-operation type. Sterilizer 6 stores a group of loaded carrier trucks 7b upon which the can-sealed products 2 are stacked in the specified form of FIG. 2. The cans are sterilized using high-temperature and high-pressure water or water vapor. The sterilized products are then cooled with cooling water or the like and thereafter a door 8 is opened so as to discharge the trucks, piece by piece onto a rotary table 9. An unloading machine 10 is provided which is adapted to unload the sterilized can-sealed products 2 from the series of stack-loading trucks 7b, and which operates, in contrast to the stacking machine 3, to unload the products 2 that have been subjected to the sterilizing process. The cans are unloaded into a single series of, or a plurality of series of sterilized cans that are carried away by a carrying conveyor 11.

A tracking rail 12a, is used to convey a vacant or unloaded track 7c from the unloading machine 10 over to the loading machine 3. Also, there are provided other rails 12b and 12c for a similar purpose between the stacking machine 3 and the sterilizer unit 6, and between the sterilizer unit 6 and the unloading machine 10, respectively. Each of these rails 12b and 12c is specifically designed for guiding the carrier trucks 7a and 7b to the desired operating positions, respectively.

The conventional sterilization process system noted above is generally arranged in practice such that there are provided a desired number of vacant trucks 7c, the vacant trucks 7c being sent to the stacking machine 3, and the loaded trucks 7a being gathered in a leading pool on the tracking rail 12b provided between the stacking machine 3 and the sterilizer unit 6. The stacking machine 3 and the unloading machine 10 can also be used with a supply or pool of the sterilized product carrying trucks 7b, on the rail 12 extending between the sterilizer unit 6 and the unloading machine 10. The track runs of the empty trucks 7c and the stack carrying trucks 7a and 7b and the loading and unloading operations with the sterilizer unit 6 can then be automated in a practical operation. It is, however, known that this sterilization process system is subject to the following drawbacks and inconveniences that are encountered in actual operation.

Regardless of the practical employment of human labor or automated systems for the loading and unloading operations of the canned products, it is inevitable that substantial time is needed for the carrying trucks 7a and 7b to be loaded into and unloaded from the sterilizer unit 6 prior to and after the sterilization process, respectively. This results in a substantial reduction in the throughput or productivity of the entire line for producing can-sealed products. It has been essential, in practice, to increase the processing capacity of the sterilizer unit 6 for attaining a correspondingly increased throughput of the entire production line.

Furthermore, in any practical sterilization process for can-sealed products, it is absolutely necessary to prevent any confusion between a group of sterilized products and a group of unsterilized products in the flow of the process line. In the conventional arrangement, therefore, it is essential that a certain apparatus be provided to prevent confusion between sterilized and unsterilized products. Since the rails 12b and 12c for guiding the carrier trucks 7a and 7b are connected in line with each other, such an apparatus would necessarily be costly in money and technique.

Also, during the sterilization operation, the sterilizer unit 6 sometimes fails in operation.

It is then necessary to remove the canned products undergoing sterilization from the steriizer unit 6 without delay. In consideration of this countermeasure for such possible failures, it is necessary that the rail 12b be designed to be long enough to carry extra trucks 7a. This, however, causes the undesired result that the overall extension of the rail 12c must also be elongated to an undue extent, according to the balance, in the general lay-out, of the rails 12a through 12c.

On the other hand, there is a general trend to have a compound construction of the general lay-out of the sterilization process line in the case where there are provided a plurality of sterilization units. In addition, according to the conventional arrangement of the process line as typically shown in FIG. 1, the supply of the partition panels 5 from the unloading machine 10 to the stacking machine 3 is generally conducted by way of human hands (at least two men), and also there are required some more personnel at and about the rotary tables 9, thus requiring at least six men in total during ordinary operations.

SUMMARY OF THE INVENTION

The present invention proposes solutions to such drawbacks and inconveniences of conventional canned product sterilization process systems as noted above. The invention is essentially directed to the provision of an improved canned product sterilization process system, whereby the carry-in and carry-out times for carrying baskets to and from the sterilizer unit, are efficiently shortened. The possibility of confusion in the grouping or separation of sterilized and unsterilized products can eventually be eliminated and the general lay-out of the entire line for the sterilization process may well be simplified. This contributes to a substantial curtailment of the personnel required in the sterilizing line operation, and thus makes an automated non-attendance operation of the entire sterilization line possible in practice.

The objects, principles, properties and details of the present invention, as well as benefits attainable therefrom, will become more apparent from the following detailed description, by way of a preferred embodiment of the invention, when read in conjunction with the accompanying drawings.

BRIEF DESCRIPTION OF THE DRAWINGS

In the Drawings:

FIG. 1 is a general schematic view showing a sterilization process system for can-sealed products of conventional construction;

FIG. 2 is a schematic perspective view showing the general appearance of the canned products in a stacked state;

FIG. 10 is a top plan view showing the unloader unit;

FIG. 11 is a cross-sectional view taken along the line XI—XI in FIG. 10; and

DETAILED DESCRIPTION OF THE INVENTION

Figure 3:
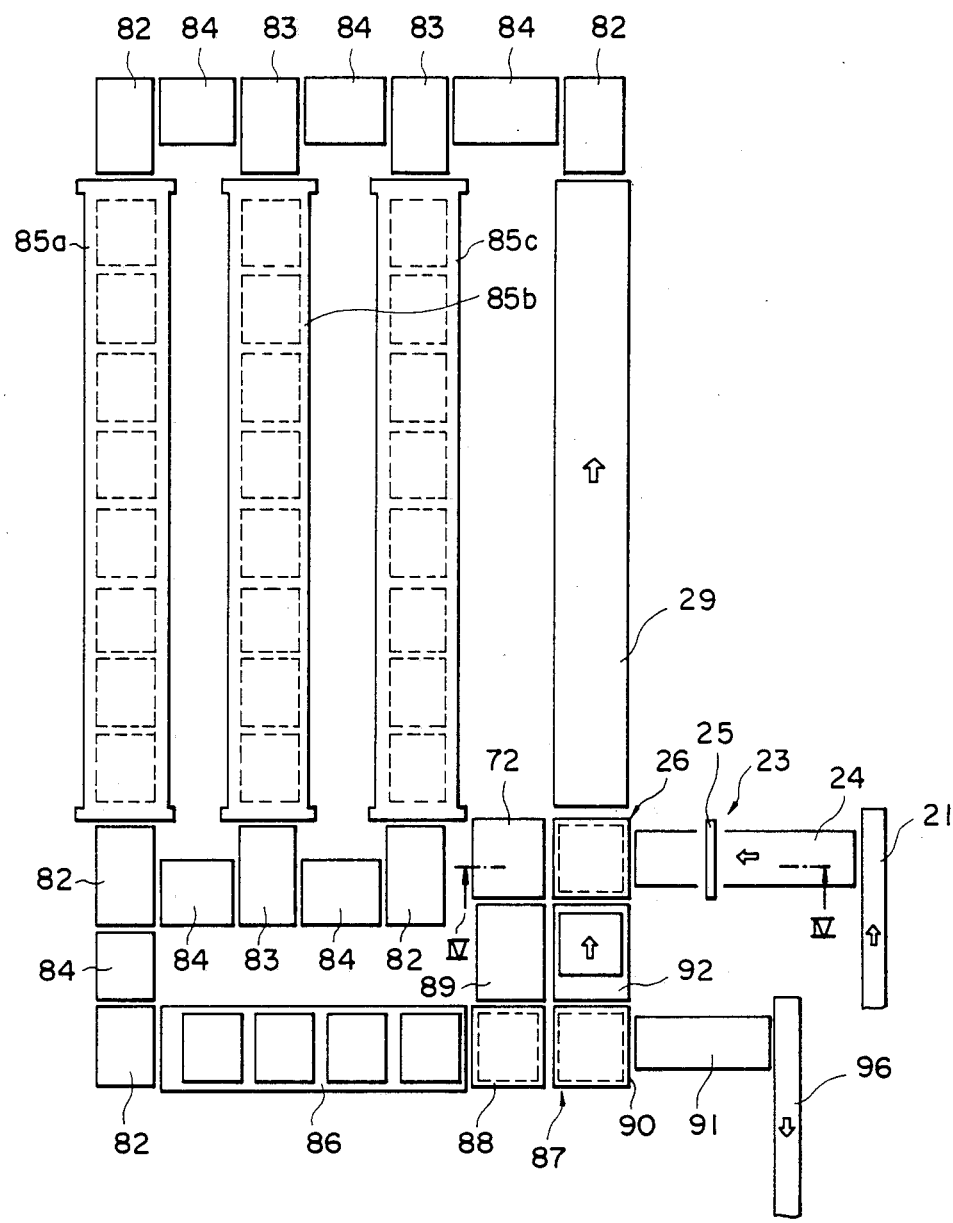
FIG. 3 is a top plan view showing general lay-out of a canned product sterilization process system with carrying baskets in a start-up position, according to a preferred embodiment of the present invention.

The present invention will now be explained by way of a preferred embodiment thereof, as adapted in practice to the sterilization process for the can-sealed products (hereinafter referred to as "canned products") making reference to the drawings attached herewith. Now, referring specifically to FIG. 3, there is shown a product supply conveyor 21, which is connected in operative relationship with a filing and sealing unit (not shown), and which is adapted to supply the canned products (shown at 22 in FIG. 5) to a loading unit 23. The loading unit 23 comprises, as principal components, a layer conveyor 24, a layer stopper 25 and a product loader 26, which are adapted to load a required number of stages of canned products 22 supplied from the supply conveyor 21, into position in a carrying basket 28, each stage including a specified number of canned products, as typically shown in FIG. 4, separated by partition panels 27. The loading unit 23 carries the thus-loaded baskets 28 toward a position where they are relayed onto a basket pool conveyor 29 as shown in FIG. 3.

Figure 8:
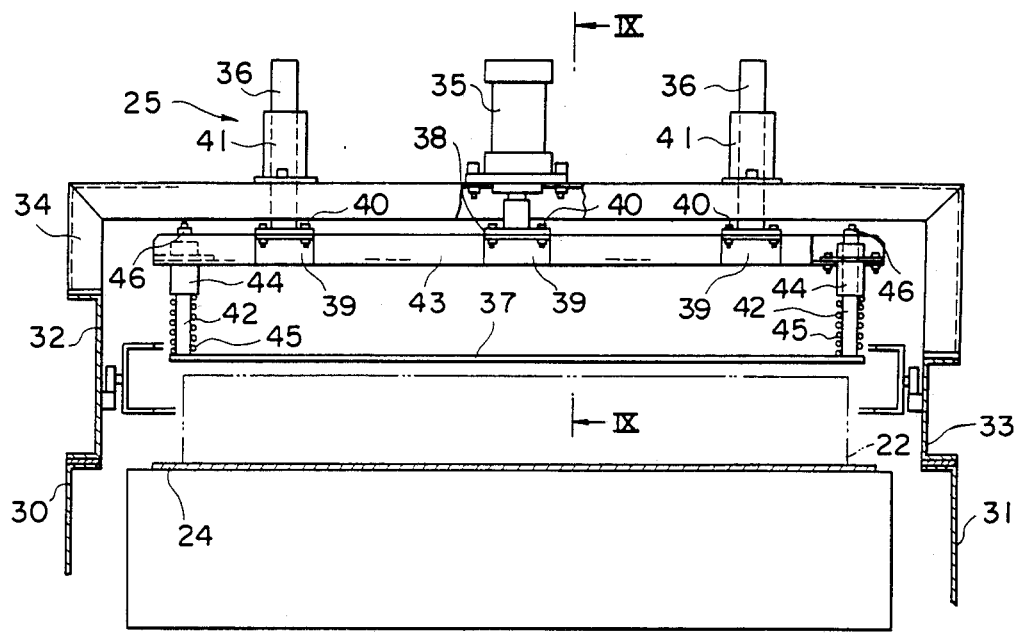
FIG. 8 is a cross-sectional view taken along the line VIII—VIII in FIG. 4.
Figure 9:
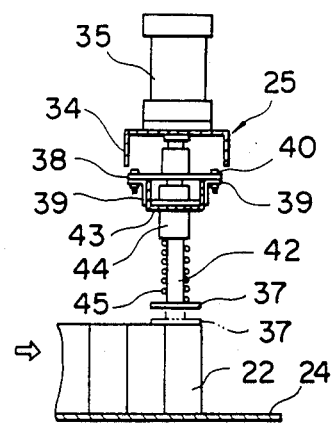
FIG. 9 is a cross-sectional view taken along the line IX—IX in FIG. 8.

The layer conveyor 24 is adapted in operation, to continuously carry the canned products 22 fed by the supply conveyor 21, after having rotated these products as a unit by 90 degrees by way of a rotating guide or the like (not shown), toward the product loader 26. The layer stopper 25, comprises, as typically shown in FIGS. 8 and 9, side frames 32 and 33 seen fixed in position on right and left main frames 30 and 31, a gate secured upon the side frames 32, 33 and extending across the layer conveyor 24, a pneumatic cylinder 35 and guide shafts 36 mounted upon the gate 34, and a stopper plate 37 extending across the layer conveyor 24 and adapted to come into contact with the top of the series of canned products carried along with the conveyor 24 so as to have them stopped in their travelling motion on the conveyor 24.

The pneumatic cylinder 35 has its rod section secured to a plate 38 to which angle braces 39, 39 are fixed in position by locking bolts 40. The guide shafts 36 are slidably held by way of guide bearings 41 secured upon the gate 34, with the angle braces 39, 39 being fixed rigidly at their lower ends by the bolts 40, similar to the pneumatic cylinder 35 noted above. At the opposite ends of the stopper plate 37 there are secured guide shafts 42, respectively, the guide shafts 42 being introduced slidaby into guide bearings 44 fixed to a channel bar 43. The channel bar 43 extends in a loosely mounted relationship between the angle braces 39, 39 in such a manner that it may abut the plate 38 in a close contact relationship therewith. Compression springs 45 are introduced at the lower ends of the guide bearings 44, which are adjustable with their urging forces applied against the canned products 22 by way of the stopper plate 37 by screwing or unscrewing nuts 46.

Figure 4:
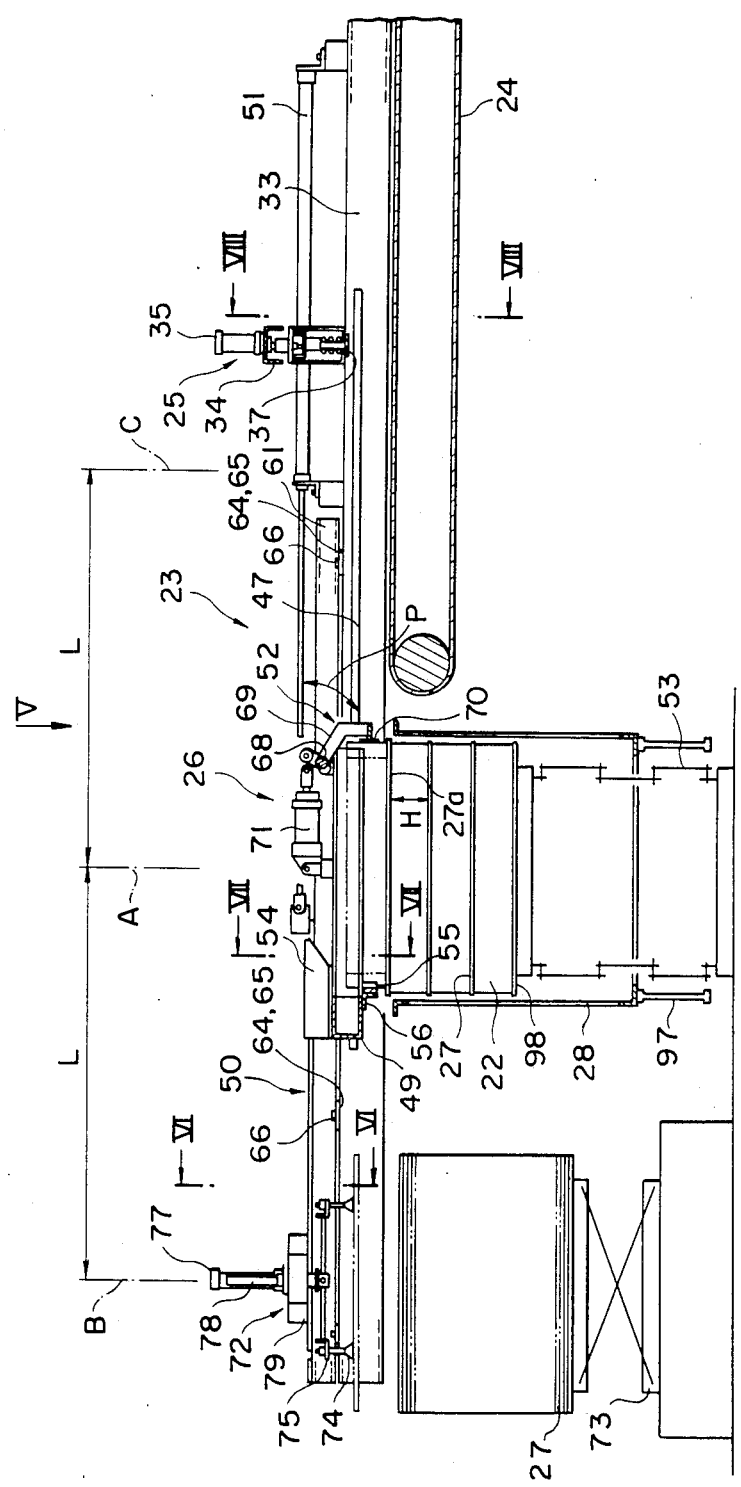
FIG. 4 is a cross-sectional view taken along the line IV—IV in FIG. 3.
Figure 5:
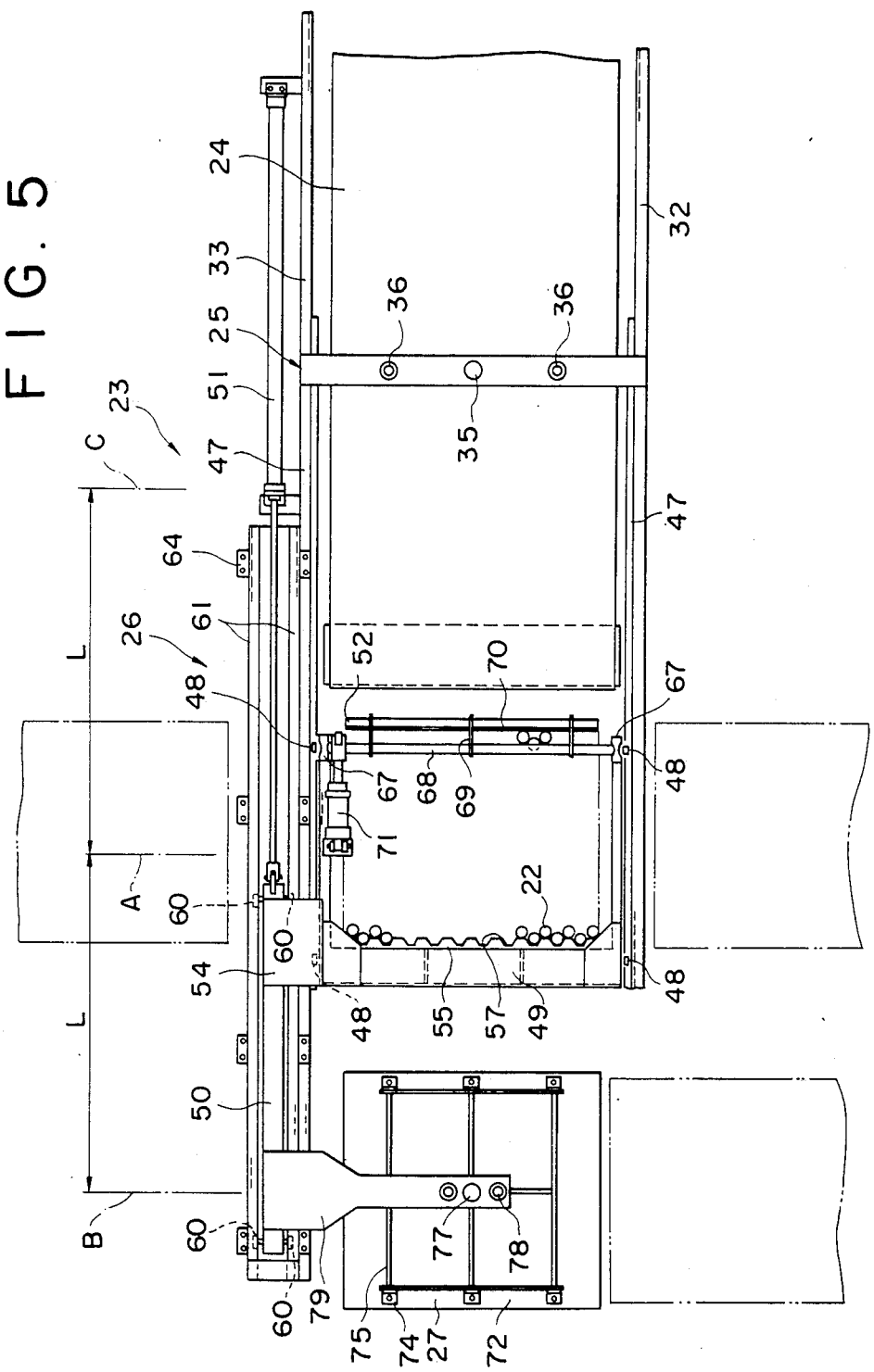
FIG. 5 is a plan view seen in the direction shown by the arrow V in FIG. 4.

The product loader 26 comprises, as shown in FIG. 5, a carriage frame 49 supported by way of wheels 48 at four points adapted to run along a pair of rails 47 which are integral with the above mentioned side frames 32, 33, a truck 50 constucted integrally with the carrier frame 49, a pneumatic cylinder 51 adapted to cause the truck 50 to travel back and forth, a rear stopper 52 mounted on the carriage frame 49, and a lifter 53 (FIG. 4) for loading the canned products 22 in a stacked position by aid of the partition panels 27. A bracket 54 is mounted by welding or otherwise, on the carrier frame 49 as typically shown in FIG. 7, with the other end of the bracket 54 being fixed rigidly to the truck 50.

Figure 7:
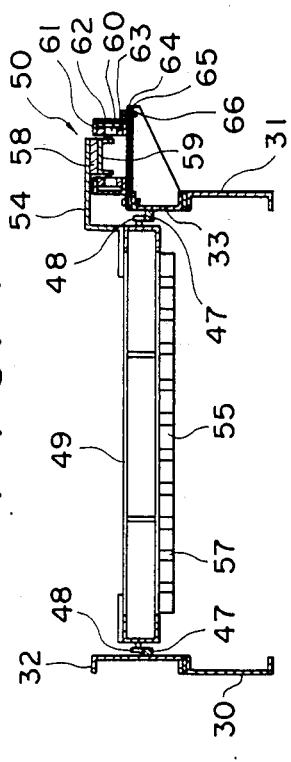
FIG. 7 is a cross-sectional view taken along the line VII—VII in FIG. 4.

As shown in FIGS. 4, 5 and 7, a block 55 acting as a front stopper, is fixed securely to the lower end of the carrier frame 49 by way of an angle 56 in such a manner that the carried products 22 may be stored in positions of a recessed portion 57. The truck 50 is constructed to bind a channel bar 59 together with the bracket 54 and a plate 58, with four wheels 50 mounted rotatably on the side of the channel bar 59 for travelling motion along a pair of guide rails 62, 62 disposed in the inside of a guide rail frame 61. There is provided a base bracket 64, secured integrally with the guide rail frame 61 and a bracket 55 integral with the side frame 33 by using lock bolts 66.

The pneumatic cylinder 51 is operatively connected to the end of the truck 50 in such a manner that the truck 50 is caused to travel in reciprocating motion with a stroke "L" as shown in FIGS. 4 and 5. The rear stopper 52 is comprised of bearings 67 positioned rigidly on the carrier frame 49, a shaft 68 journaled rotatably by the bearings 67, arms 69 fixed rigidly on the shaft 68, a plate 70 fixed securely to the arms 69 for abutting against the back of the canned products 22, and a pneumatic cylinder 71 connected operatively to the shaft 68 through a linkage mechanism so that it causes the arms 69 to move in the direction shown by the arrow "P" as viewed in FIG. 4.

Figure 6:
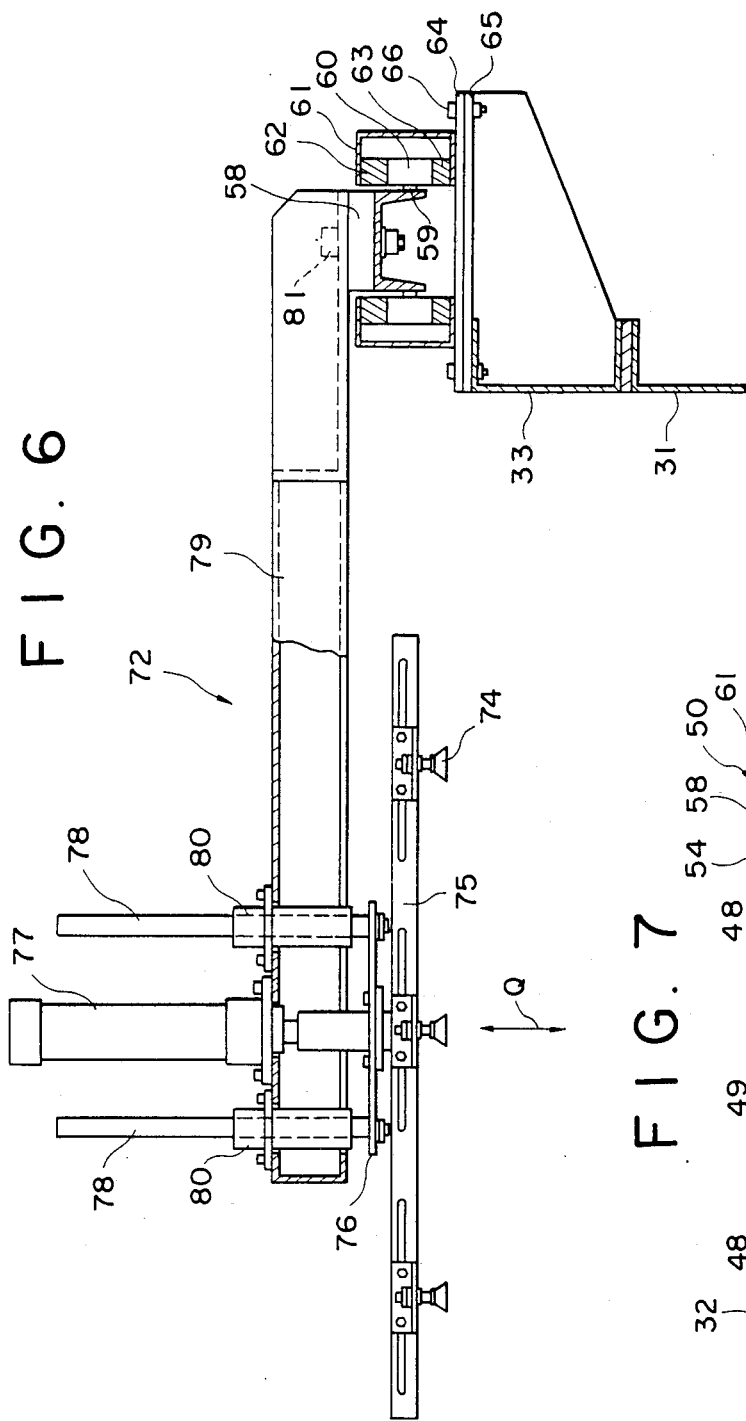
FIG. 6 is a cross-section view taken along the line VI—VI in FIG. 4.

In FIG. 6, a partition panel suction apparatus 72 is shown which is adapted to pick up a partition panel 27 piece by piece by sucking function from a lifter 73 (see FIG. 4), upon which a plurality of partition panels 27 are stacked one upon another, and shifts a thus-picked-up panel toward the carrier frame 49 by the stroke "L" of the pneumatic cylinder 51, thereafter releasing the partition panel 27 down upon the canned products 22 aligned on the commonly known lifter 53 for lifting motions within the carrier basket 28. There is provided a bracket 75 mounting six sucking discs 74 disposed shiftably and depending downwardly at an adjustable interval, and which is suspended operatively from a pneumatic cylinder 77 through a plate 76 in such a manner that it can adjustably be shifted in the vertical directions, as shown by the arrow "Q". There is also shown a pair of guide shafts 78 secured rigidly at their lower ends to the plate 76 and extending slidably through guide bearings 80 fixed upon a support bracket 79. The support bracket 79, having the pneumatic cylinder 77 and the guide bearings 80 mounted securely thereon, is fixed rigidly upon the truck 50 by way of bolts 81.

FIGS. 3 and 12 to 15 show a corner transfer conveyor 82 (upper right in FIG. 3) which is adapted to turn a basket 28 containing a stack of unsterilized canned products 22 (hereinafter referred to as "the unsterilized can containing basket 28a"), carried along with the basket pool conveyor 49, by 90° in turning motion by the aid of rotating rollers driven by means not shown. Also shown in a transfer conveyor 83, which is adapted to carry the unsterilized can containing basket 28a noted above, which has been carried along by a carrying conveyor 84, into sterilization processors 85b and 85c. Several conveyors 82, 83 and 34 are shown which perform similar functions.

A basket pool conveyor 86 is adapted to convey sterilized can containing baskets 28b that have passed through the sterilization process at sterilization processers 85a, 85b and 85c by aid of the corner transfer conveyor 82, the carrying conveyor 84, the transfer conveyor 83, etc., and have thus conveyed baskets 28b held temporarily in the pool prior to the entrance to an unloading unit 87, thereafter carrying the sterilized can containing baskets 28b in the downstream direction of an unloading unit 90. Also, the unloading unit 87 is located in a generally symmetrical relationship with the loading unit 23, and operates to handle the sterilized can containing basket 28b carried along with the basket pool conveyor 86 in such a manner that the partition panels 27 are picked up and delivered by another partition panel suction apparatus 88 over to the partition panel suction apparatus 72 through the partition panel supply conveyor 89, and that the canned products 22 are discharged onto a discharging conveyor 91 by function of the unloading unit 90, and also that the vacant or unloaded baskets 28 are taken away to the product loader 26 noted above by way of a basket conveyor 92, respectively.

As the partition panel suction apparatus 88 is of identical construction with that of the partition panel suction apparatus 72 noted above, the same reference numerals as those for apparatus 72, will be used in the following description. This treatment shall apply to other like components involved hereinafter, accordingly. The partition panel 27 is lifted upwardly at the position A shown in FIG. 10 by function of the suction discs 74 from the sterilized can containing basket 28b which has been carried toward the unloading unit 90 from the basket pool conveyor 86. After having shifted to the position B by operating the pneumatic cylinder 51, the partition panel 27 is discharged onto the partition panel supply conveyor 89 (which is placed in a crossing relationship with respect to the basket pool conveyor 86 so that it may not interfere with the shifting motion of the sterilized can containing basket 28b during operation).

It is noted that the substantial difference between the unloading unit 90 and the product loader 26 resides in the use of a front stopper 93 in place of the rear stopper 52. The block 55 is replaced by a pusher bar 94, and also the layer stopper 25 is omitted. As shown in FIG. 11, the front stopper designated at 93, is constructed in such a manner that an arm 95 fixed around the shaft 68 may be rotated in the direction shown by the arrow "R". The pusher bar 94 is fixed rigidly to the lower part of the carrier frame 49, so that it can come to abut the backs of the canned products 22, when they approach during the conveyance.

FIG. 3 shows a discharging conveyor 96, which is adapted to convey the canned products 22 that are finished with the sterilization process, into subsequent steps of the processing line.

Next, referring to the operation of the present canned product sterilization process system, the canned products 22 delivered from the filling and sealing equipment (not shown) to the layer conveyor 24 through the supply conveyor 21 are now transferred toward the product loader 26, while being realigned to a specified width of arrangement during the conveyance with a closely crammed relationship with each other. After passing the series of canned products aligned in one layer or stage of the general appearance shown in FIG. 2, the stopper plate 37 (FIGS. 4 and 8) is caused to be lowered into position by function of the pneumatic cylinder 35 of the layer stopper 25 so that it may come to urge and stop the leading line of canned products 22 in the following lot as schematically shown by the two-dot chain line in FIG. 9. At this moment, the product loader 26 is located at the position C, FIG. 5, working to stop the leading line of canned products 22 while progressing along with the layer conveyor 24 with the block 55, and operating the pneumatic cylinder 71 so as to cause the arms 69 to turn in the clockwise direction for holding the group of canned products 22 in sandwiched relationship with the block 55, accordingly.

In the following step, as the pneumatic cylinder 51 is actuated, the product loader 26 is caused to shift with one stack or stage of canned products 22 toward the position A (there is provided a can guide panel not shown between the product loader 26 and the layer conveyor 24). On the other hand, the vacant or unloaded basket 28 delivered to the position A from the basket conveyor 92 is placed onto sprockets 97 as shown in FIG. 4, and as the ground panel 98 is lifted at the level of the partition panel 27a by function of the lifter 53 (see FIG. 4) at this moment, one stage of canned products 22 is now ready to be transferred onto the ground panel 98, thereafter the arms 69 are caused to be rotated in the counterclockwise direction so as to release these canned products, and then the lifter 53 is lowered to position by the pitch "H" ready for the subsequent steps. While the product loader 26 is located at the position A, or with the partition panel suction apparatus 72 staying in the position B, the pneumatic cylinder 77 is operated so as to cause the suction discs 74 to be lowered upon a partition panel 27 to engage in sucking function therewith, then turning back to the position shown by the two-dot chain line in FIG. 4.

Next, by actuating the pneumatic cylinder 51, the product loader 26 is shifted from the position A to the position C, thereby holding the one stage of canned products 22 in sandwiched relationship, and concurrently, the partition panel suction apparatus 72 functions to pick-up a sheet of partition panel 27 by suction and deliver the same from the position B to the position A, where it releases the partition panel 27 upon the canned products 22 arranged on the ground panel 98.

Figure 12:
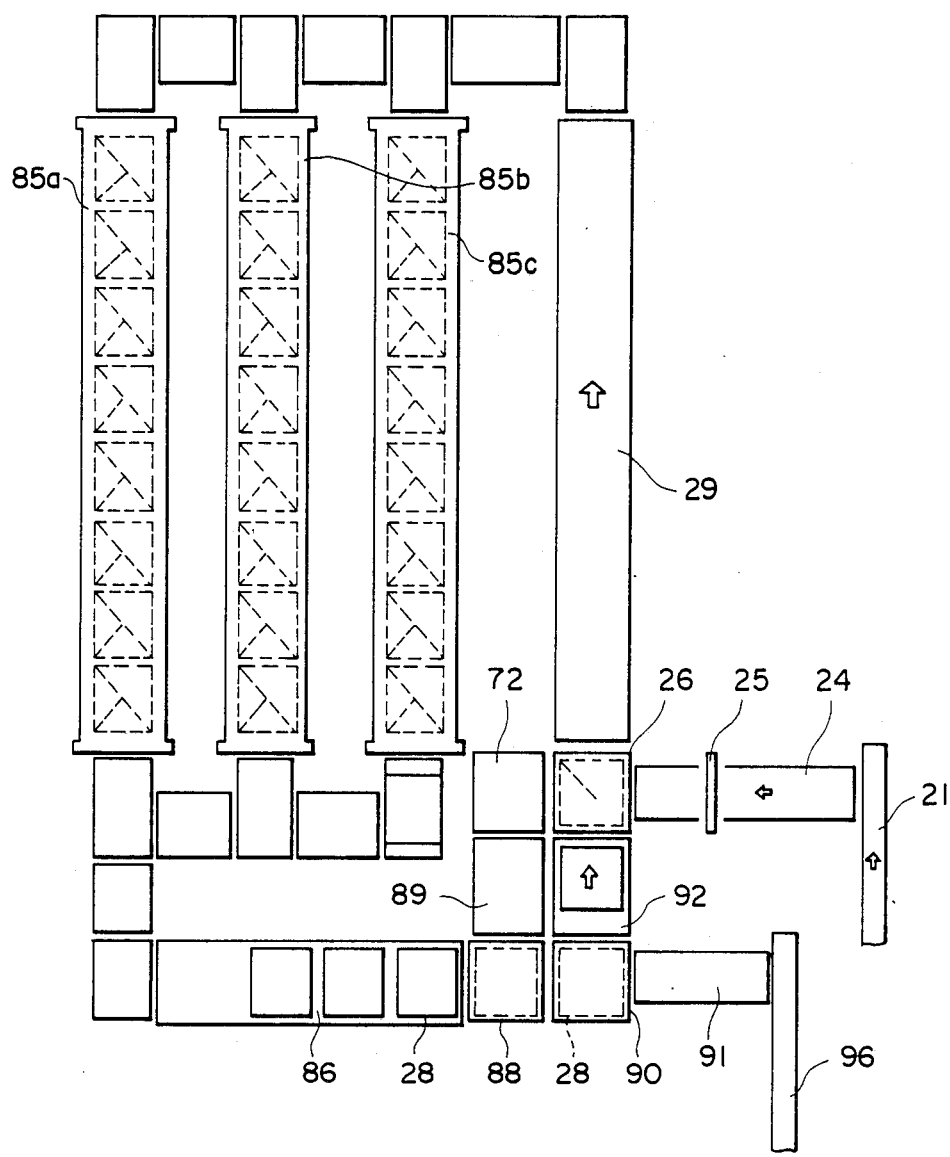
FIGS. 12, 13, 14 and 15 are general views, similar to FIG. 3, showing the states of operation of the sterilization process system of the invention.

Repeating the working cycle noted above, the carrying basket 28 is duly filled up with the required number of stages of canned products 22, thereafter to be delivered to the basket pool conveyor 29. Subsequently, a series of vacant baskets 28 (shown by solid-line squares and dotted-line squares) are filled in sequence with a required number of stages of canned products 22 and then delivered into the three sterilization processers 85a through 85c, which is generally shown in FIG. 12. (In the drawing figures, a square with a quarter diagonal line in it shows the one in the loading step; the square with one and a quarter diagonal lines showing it in the sterilizing state in the processing line.)

Figure 13:
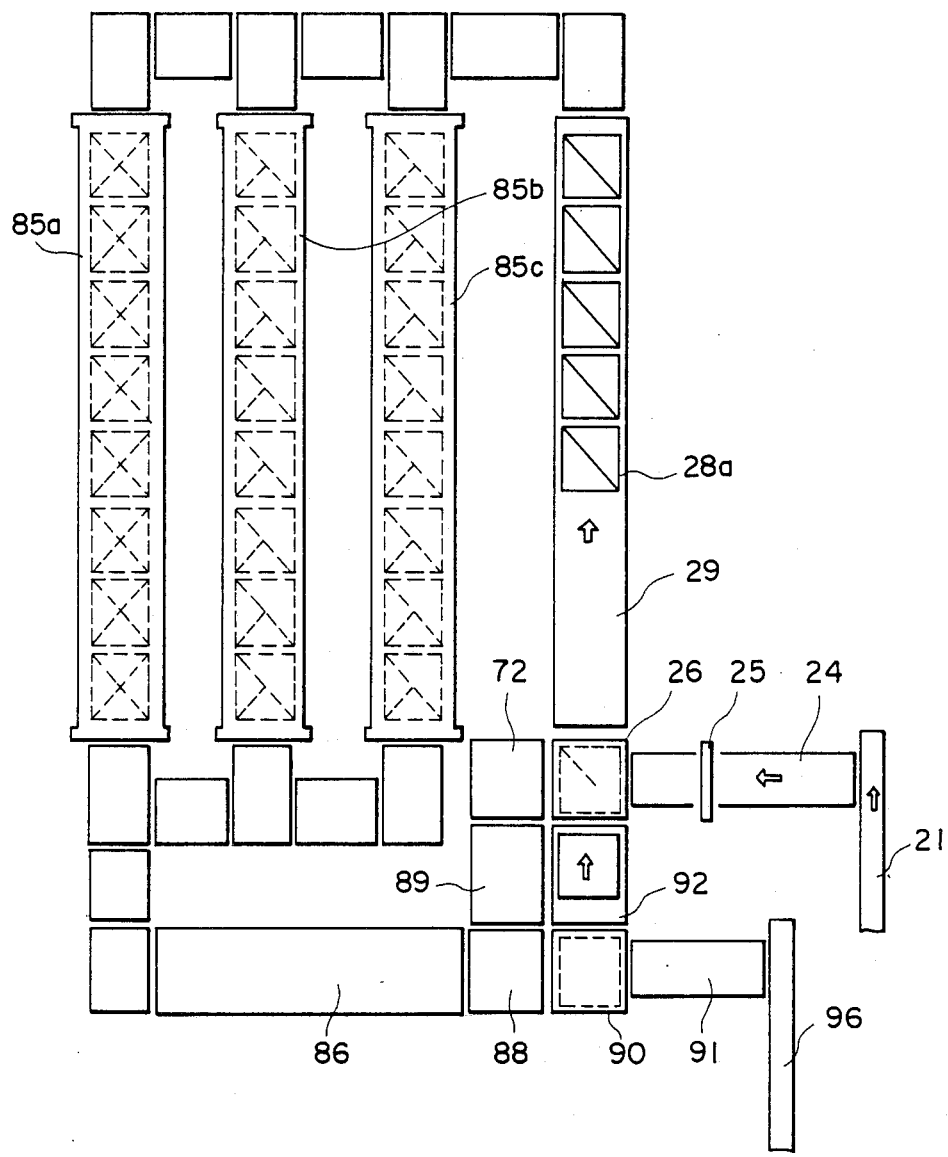
Figure 14:
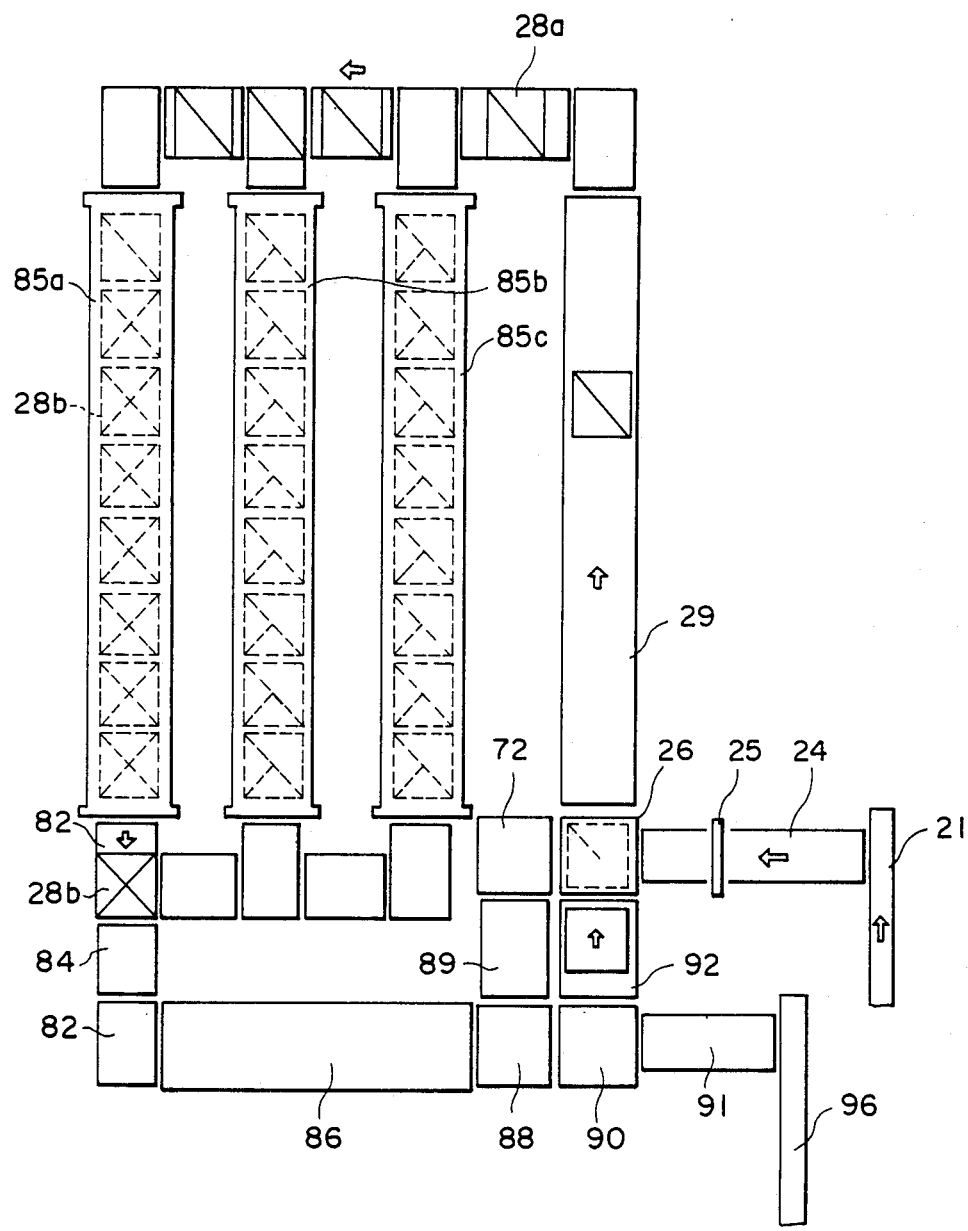

In FIG. 13, there is shown the state that the loaded basket 28 in the sterilization processer 85a is completed with its sterilization process. (a dotted-line square with two diagonal lines in it shows the one completed with the sterilization). Now, in FIG. 14, there is shown the state that the sterilized can containing baskets 28b in the sterilization processer 85a are carried to the basket pool conveyor 86 through the corner transfer conveyor 82 and the carrier conveyor 84, while delivering the unsterilized can containing baskets 28a into the sterilization processer 85a.

Figure 15:
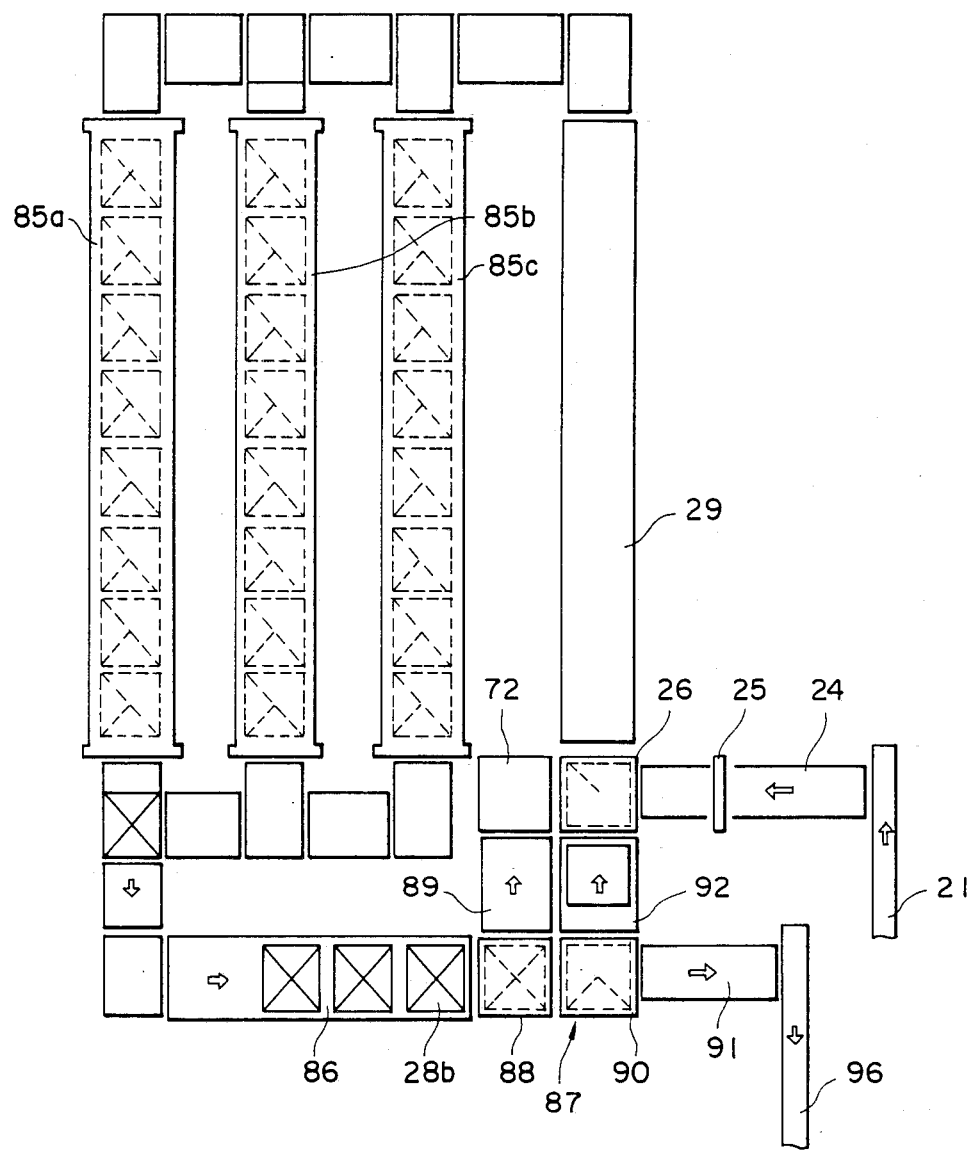

Now, referring to the sterilization processers 85b and 85c, the same sequence of processing is performed as in the sterilization processer 85a, thus resulting in the arrangement of backets as shown in FIG. 15. The difference from FIG. 12 is in that the sterilized can containing baskets 28b are being delivered to the unloading unit 87, in contrast to the vacant or unloaded baskets 28.

Next, reference is made to the unloading procedure of the sterilized can containing basket 28b. In the first place, the sterilized can containing baskets 28b carried along with the basket pool conveyor 86 into the position under the unloading unit 90, or into the position A, are then subjected to handling with which the sterilized canned products 22 are raised upwardly to the position shown by the two-dot chain line in FIG. 11 by way of the lifter 53. At this moment, the pneumatic cylinder 71 is operated to rotate the arm 95 clockwise into the solid-line position as viewed in FIG. 11, thereafter the pneumatic cylinder 51 functioning to cause the carriage frame 49 of the unloading unit 90 to be shifted from the position A to the position C, and then the highest stage of canned products 22 is subjected to the urging force of the pusher bar 94 so as to be discharged through the can guide plate (not shown) to the discharging conveyor 91, then causing the arm 95 to be rotated counterclockwise by the actuation of the pneumatic cylinder 51, and then delivered to the subsequent handling procedure in the processing line by way of the discharging conveyor 96.

When the carriage frame 49 of the unloading unit 90 is in the position C, the partition panel suction apparatus 88 remains in the position A, operating the pneumatic cylinder 77 to cause the suction discs 74 to be lowered so as to engage the partition panel 27 suction. Next, the pneumatic cylinder 51 is actuated so that the partition panel suction apparatus 88 is shifted from the position A to the position B, and the carriage frame 49 of the unloading unit 90 from the position C to the position A, respectively, where the partition panel suction apparatus 88 functions to release the partition panel 27 onto the partition panel supply conveyor 89 so that a plurality of partition panels 27 may be stacked upon the lifter 73 on the part of the loading unit 23, and at the same time, the unloading unit 90 functions in the same sequence of operations as noted above.

In accordance with the repetition of the same working cycles as stated hereinbefore, it is noted that the sterilized canned products 22 are eventually delivered over to the discharging conveyor 91, the partition panels 27 being delivered over to the partition panel supply conveyor 89, and the vacant baskets 28 are delivered to the product loader 26 through the basket conveyor 92, respectively.

As fully explained in detail herein by way of the preferred embodiment of the present invention, it is to be noted that the overall period of time required for the delivery of the series of baskets into and out of the sterilization processers 85 can be curtailed substantially by virtue of the employment of the "first-in, first out" process with the entrance and the exit for the baskets with respect to the sterilization processers provided separately from each other, accordingly. Also, it is notable that there is no longer left any fear of confusion of the sterilized and unsterilized groups of canned products, by virtue of the arrangement that there is no operative connection between the conveyors for the unsterilized and sterilized can baskets. Furthermore, according to the advantage of automated supply and removal procedures for the partition panels, there can be effected an optimalized control on the current quantity of baskets put in the pool before and after the sterilization processers in the processing line to an as small as possible number, thereby resulting in an as simple as possible lay-out of the processing line. In addition, there is attained a substantial curtailment of the personnel for attendance at the processing line, or even a nonattendance operation is feasible in practice, by virtue of the employment of the automation in the supply and removal procedures of the partition panels, accordingly.

While the present invention was fully explained hereinbefore by way of the preferred embodiment thereof, it is to be understood that the present invention is not intended to be restricted to the details of the specific construction shown in the preferred embodiment, but to the contrary, many changes and modifications may be made in the foregoing teachings without any restriction thereto and without departing from the spirit and scope of the invention.

It is also to be understood that the appended claims are intended to cover all of such generic and specific features particular to the invention as disclosed herein and all statements relating to the scope of the invention, which as a matter of language might be said to fall thereunder.

What is claimed is:

1. A sterilization system for canned products comprising:
    a supply conveyor for supplying canned products;
    a layer conveyor having an input end adjacent said supply conveyor for receiving canned products therefrom and an output end for discharging a layer of canned products;
    layer stopping means positioned adjacent said layer conveyor intermediate said input and output ends thereof for stopping a layer of canned products on said layer conveyor;
    first panel lifting means at said output end of said layer conveyor for receiving a partition panel at a horizontal level of said output end;
    a basket conveyor having a basket unloading position and an opposite basket loading position, said basket loading position being at said first panel lifting means, said basket conveyor receiving a basket having an open bottom at said basket loading position with a top of the basket being below the horizontal level of said output end of said layer conveyor, the basket conveyor operating to move baskets from said basket unloading position to said basket loading position;
    a product loader having a front stop and a rear stop for holding a layer of canned products therebetween;
    second panel lifting means next to said first panel lifting means, said second panel lifting means being for receiving a stack of partition panels;
    panel suction means for engaging a partition panel in a stack of panels on said second panel lifting means and for conveying the panel onto said first panel lifting means; truck means connected to said panel suction means and said product loader for alternately moving a layer of products held between said front and rear stops of said product loader onto a panel on said first panel lifting means, and moving said panel suction means to place a panel on the layer of products after said first lifting means has lowered the layer of products into a basket at said basket loading position,
    so that a stack of alternating layers of canned products and partition panels is formed in the basket at said basket loading position;
    a first basket pool conveyor having an input end for receiving a basket loaded with panels and canned products from said basket loading position, said first basket pool conveyor having an output end for discharging baskets loaded with panels and canned products;
    at least one sterilization unit having an input end adjacent said output end of said first basket pooling conveyor, said sterilization unit having an output end for discharging baskets containing panels and sterilized canned products;
    a second basket pool conveyor at said output end of said sterilization unit, said second basket pool conveyor having an output end adjacent said basket unloading position of said basket conveyor for discharging baskets with panels and sterilized products onto said basket conveyor at said basket unloading position;
    unloading means at said basket unloading position for unloading alternate panels and layers of sterilized products from a basket at said basket unloading position;
    a discharge conveyor for receiving sterilized canned products from said unloading means; and
    a panel conveyor for receiving panels from said unloading means and conveying said panels onto said second panel lifting means;
    said supply, layer, basket, first basket pool, second basket pool and panel conveyors all extending substantially horizontally and said sterilizing unit extending substantially horizontally.

2. A sterilization system according to claim 1, wherein said unloading means comprises a further layer conveyor for supplying layers of sterilized products to said discharge conveyor; further panel lifting means for lifting a lowermost panel in a basket at said basket unloading position to a level where an upper layer of sterilized products is brought to a horizontal level of said further layer conveyor; a product unloader having front and rear stops for holding a layer of products therebetween and for moving the layer of products from above said further first panel lifting means onto said further layer conveyor; further panel suction means for engaging an uppermost panel on said further first panel lifting means and for moving the engaged panel onto said panel conveyor; further truck means connected to said product unloader and said further panel suction means for alternately moving an uppermost layer of products from said further first panel lifting means onto said further layer conveyor and for moving an uppermost panel from said further first panel lifting means onto said panel conveyor.

3. A sterilization system according to claim 2, wherein said panel conveyor is movable transversely to said second basket pool conveyor and above said second basket pool conveyor for depositing panels placed on said panel conveyor by said further panel suction means, onto said second panel lifting means.

4. A sterilization system according to claim 3, wherein said basket conveyor moves parallel to said panel conveyor, said first-mentioned and further layer conveyors moves transversely to said panel conveyor.

5. A sterilization system according to claim 2, including a plurality of sterilization units all extending parallel to each other and being spaced laterally to each other, said first pool conveyor having means for supplying baskets selectively to an input end of each of said sterilization units, said second basket pool conveyor including means for receiving baskets from an output end of each of said sterilization units.

6. A sterilization unit according to claim 5, wherein said panel and basket conveyors extend parallel to each other and parallel to said first basket pool conveyor and to said plurality of sterilization units, said layer conveyors and said second basket pool conveyor extending parallel to each other and transversely to said panel conveyor.

* * * * *